US012560725B2

(12) United States Patent
    Bryant

(10) Patent No.:    US 12,560,725 B2
(45) Date of Patent:        Feb. 24, 2026

(54) STATIC GNSS POSITIONING

(71) Applicant: u-blox AG, Thalwil (CH)

(72) Inventor: Roderick Bryant, Conder (AU)

(73) Assignee: u-blox AG, Thalwil (CH)

( * ) Notice:    Subject to any disclaimer, the term of this patent is extended or adjusted under 35 U.S.C. 154(b) by 268 days.

(21) Appl. No.: 18/219,843

(22) Filed:    Jul. 10, 2023

(65)              Prior Publication Data

US 2024/0012156 A1      Jan. 11, 2024

(30)        Foreign Application Priority Data

Jul. 11, 2022    (EP) ..................................... 22184179

(51) Int. Cl.
      G01S 19/25              (2010.01)
(52) U.S. Cl.
      CPC .......... G01S 19/258 (2013.01); G01S 19/256 (2013.01)
(58) Field of Classification Search
      CPC ............................. G01S 19/258; G01S 19/256
      USPC ..... 342/357.22, 357.25, 357.74, 352, 36, 59
      See application file for complete search history.

(56)              References Cited

U.S. PATENT DOCUMENTS

2010/0188286 A1*    7/2010   Bickerstaff ............. G01S 19/42
                                                              342/357.22

FOREIGN PATENT DOCUMENTS

EP            0166300 A2      1/1986
   EP            0166300 A3      7/1987

OTHER PUBLICATIONS

Extended Search Report in European Appln. No. 22184179.4, dated Nov. 21, 2022, 9 pages.

* cited by examiner

*Primary Examiner* — Bo Fan
(74) *Attorney, Agent, or Firm* — Fish & Richardson P.C.

(57)              ABSTRACT

A static GNSS receiver, a base station module, a method of estimating a position of a static GNSS receiver, and an associated computer program are provided. An example method includes calculating a first difference between a first pseudorange and a second pseudorange, each made at a first time. A second difference between a third pseudorange and a fourth pseudorange, each made at a second time, is calculated, with the second time different to the first time. A position of the GNSS receiver is calculated based at least in part on the accumulated pseudorange differences.

15 Claims, 3 Drawing Sheets

STATIC GNSS POSITIONING

CROSS-REFERENCE TO RELATED APPLICATIONS

This application claims priority to European Application No. 22184179.4, filed on Jul. 11, 2022, the contents of which are incorporated herein by reference in their entirety.

FIELD OF THE INVENTION

The present invention relates to positioning using Global Navigation Satellite Systems (GNSS). In particular, it relates to positioning of a static GNSS receiver.

BACKGROUND OF THE INVENTION

Techniques for GNSS positioning are well known in the art. Each GNSS positioning technique requires at least one GNSS—some examples of which include the Global Positioning System (GPS), Galileo, GLONASS, and the BeiDou Navigation Satellite System (BDS), also known simply as "BeiDou". Each GNSS comprises a constellation of satellites, also known in the art as "space vehicles" (SVs), which orbit the Earth. A conventional GNSS positioning technique comprises calculating a pseudorange from a GNSS receiver to each in-view SV. One such conventional positioning technique is a code-based positioning technique, in which the code phase of a pseudorandom noise (PRN) code, modulated onto a carrier signal transmitted by an SV, is measured. The pseudoranges are used to calculate the position and the clock error of the GNSS receiver by multilateration, based on the GNSS signals transmitted from at least four SVs and received by the GNSS receiver.

A navigation message in a GNSS signal transmitted from an SV comprises timing information, such as a timestamp of the transmission time of the GNSS signal from the SV. The timing information originating from the SVs is precise, as a result of multiple atomic clocks contained in each SV that are synchronised with a master clock on Earth. A GNSS timing receiver is a GNSS receiver whose primary purpose is to output timing data, such as a precise local time at the GNSS receiver. A GNSS timing receiver has a timing mode in which it calculates time and does not calculate position. A GNSS timing receiver can provide high-precision time and frequency data without being fitted with an atomic clock, which is a relatively expensive timing solution. By knowing an accurate static position of a GNSS timing receiver and using at least one GNSS measurement made by the GNSS timing receiver, precise timing data can be generated by the GNSS timing receiver.

Precise timing data generated from GNSS signals is useful for a variety of applications including, but not limited to, communications networks, data centres, and financial networks. In one example, high-frequency traders and brokers require precise timestamps of financial transactions, to be able to keep track of trading events. In another example, the timing information provided by each GNSS signal is used to synchronise a communications network, such as a 5G cellular network. All base stations in such a communications network have to be tightly synchronised, to allow wireless devices on the network to share the limited section of the frequency spectrum they operate on, without generating signal interference.

SUMMARY OF THE INVENTION

It would be desirable to provide a GNSS receiver that can provide precise timing data even when mounted in a challenging signal environment. In one example, 5G communication networks may include small cells which provide cellular coverage over a relatively small geographic area, from an order of one metre to one kilometre. Precise timing data is needed by each base station, for synchronisation. Integrating a GNSS receiver in the base station is one convenient way to obtain this precise timing data. Due to the reduction in cell size, GNSS receivers integrated in base stations are increasingly being mounted in challenging signal environments—for example, indoors or in an urban environment (such as on poles or on walls between tall buildings)—to provide full cellular coverage. Any error in the "known" position of a GNSS timing receiver may give rise to an error in the calculated timing data. Therefore, in order to reduce timing inaccuracies, the position of the timing receiver should be determined accurately. The GNSS timing receiver may have a "self-survey" mode, in which it determines its position. This mode may be used when the timing receiver is initially deployed/configured. The timing receiver may re-enter this mode later—for example, periodically, to check that it has not moved, or upon detecting that the device has been moved.

It would be desirable to estimate position as accurately as possible in the self-survey mode, so that accurate timing data can be calculated when the GNSS receiver is in timing mode. However, in this example, and more generally, when GNSS receivers are mounted in challenging environments, it can become difficult to accurately estimate their position. A GNSS receiver located in such an environment may receive few GNSS signals and/or may receive a poorer quality of GNSS signal, because very few of the SVs may be in-view of the GNSS receiver and some of those that are in view may be affected by multipath, attenuation, or interference. When receiving a small number of GNSS signals, a GNSS receiver may fail to estimate its position, as, conventionally, it is necessary for GNSS signals transmitted from at least four SVs to be received at the same time at the GNSS receiver in order to calculate a position (and time) solution. Low quality of GNSS signals also poses a problem for GNSS positioning. A poor quality GNSS signal might be a signal with a low carrier-to-noise ratio, a signal reflected off a surface before it is received at the GNSS receiver resulting in multipath interference, and/or a set of signals with poor geometric dilution of precision, which increases the error in the position calculation. A GNSS receiver receiving poor quality signals may make inaccurate pseudorange and/or carrier range measurements which, when used to calculate the position of the GNSS receiver, may lead to an inaccurate position of the GNSS receiver being calculated. An inaccurate position of the GNSS receiver being calculated may consequently lead to inaccurate timing data being produced by the GNSS receiver. It would therefore be desirable to provide a method for estimating a position solution in a challenging environment, and a GNSS receiver configured to perform such a method. More specifically, it would be desirable to provide a more robust positioning method that can cope with the intermittent visibility of a sufficient number of good quality GNSS signals.

A static GNSS receiver, a base station module, a method of estimating a position of a static GNSS receiver, and an associated computer program are provided. The method comprises calculating a first difference between a first pseudorange and a second pseudorange, each made at a first time. A second difference between a third pseudorange and a fourth pseudorange, each made at a second time, is calculated, with the second time being different to the first time.

Having accumulated pseudorange differences, in other words having accumulated the first and the second difference, a position solution for the GNSS receiver is calculated based at least in part on the accumulated pseudorange differences.

The invention is defined by the claims. According to a first aspect, there is provided a method of estimating a position of a static GNSS receiver, comprising:

obtaining a plurality of GNSS measurements, the plurality of GNSS measurements comprising first GNSS measurements and second GNSS measurements, wherein the first GNSS measurements are made by the static GNSS receiver at a first time and comprise a first pseudorange associated with a first GNSS satellite and a second pseudorange associated with a second GNSS satellite, wherein the first GNSS satellite and the second GNSS satellite are different satellites, wherein the first GNSS satellite and the second GNSS satellite are observed by the static GNSS receiver at the first time, wherein the second GNSS measurements are made by the static GNSS receiver at a second time and comprise a third pseudorange associated with a third GNSS satellite and a fourth pseudorange associated with a fourth GNSS satellite, wherein the third GNSS satellite and the fourth GNSS satellite are different satellites, wherein the third GNSS satellite and the fourth GNSS satellite are observed by the static GNSS receiver at the second time, and wherein the second time is different to the first time;

calculating a plurality of differences comprising a first difference and a second difference, wherein the first difference is calculated between the first pseudorange and the second pseudorange, and wherein the second difference is calculated between the third pseudorange and the fourth pseudorange; and estimating the position of the static GNSS receiver based at least in part on the plurality of differences.

In general, it should be understood that (unless explicitly or implicitly indicated otherwise) the words "first", "second", "third" and "fourth" are merely convenient labels. They do not—in general—mean that the entities labelled are different. While the GNSS satellites observed by the static GNSS receiver at the first time are distinct from one another, and the GNSS satellites observed at the second time are distinct from one another, one or more of the GNSS satellites observed at the first time may be the same satellites as one or more of the GNSS satellites observed at the second time. More specifically, one or both of the third GNSS satellite and the fourth GNSS satellite may be the same satellite(s) as one or both of the first GNSS satellite and the second GNSS satellite.

The first GNSS satellite and the second GNSS satellite may be in the same GNSS constellation. The third GNSS satellite and the fourth GNSS satellite may be in the same GNSS constellation. It may be less computationally complex to estimate the position of the GNSS receiver when each of the plurality of differences is between pseudoranges associated with GNSS satellites from the same GNSS constellation, as there are variations between time standards of each GNSS constellation.

The position of the static GNSS receiver may be estimated based at least in part on the first difference and the second difference.

The first difference and the second difference are also referred to herein as "GNSS measurement differences". The GNSS measurement differences are between-satellites single differences.

By calculating the difference between the first and second pseudoranges, clock bias is removed. Hence, the effect of clock drift between the first time and the second time is removed when estimating the position based at least in part on the first and the second GNSS measurement differences. Thus, a reliable position of the static GNSS receiver can be calculated.

The first time may correspond to a first epoch at the static GNSS receiver and the second time may correspond to a second, different epoch at the static GNSS receiver. The first time and the second time may correspond to consecutive epochs at the static GNSS receiver. The difference in time between two consecutive epochs may be defined as an update interval. In some examples, the first time and the second time may relate to non-consecutive epochs. In this case, the difference between the first time and the second time may be at least two update intervals.

The plurality of GNSS measurements may comprise additional GNSS measurements, different to the first GNSS measurements and the second GNSS measurements. The additional GNSS measurements may be made by the GNSS receiver at any time before, between, and/or after the first time and the second time. The additional GNSS measurements may comprise at least two additional pseudoranges. Calculating the plurality of differences may comprise calculating additional GNSS measurement differences between two of the additional pseudoranges respectively associated with different GNSS satellites observed by the static GNSS receiver at the same time.

As the position of the static GNSS receiver can be estimated based on accumulated GNSS measurement differences over multiple epochs, the method facilitates estimation of the position of the static GNSS receiver when in a challenging signal environment. The requirement to receive at least four GNSS signals in a single epoch can be relaxed. Hence, a robust positioning method is provided, which can cope with intermittent visibility of relatively small numbers of good quality GNSS signals. This helps support the use of the static GNSS receiver in a challenging signal environment. In some examples, the static GNSS receiver may be indoors. In some examples, the static GNSS receiver may be positioned in an urban environment.

A time interval between the first time and the second time may be at least one second, at least one minute, or at least one hour, for example.

The first pseudorange is derived from a first GNSS signal transmitted by the first satellite. The second pseudorange is derived from a second signal transmitted by the second satellite. The third pseudorange is derived from a third GNSS signal transmitted by the third GNSS satellite; and the fourth pseudorange is derived from a fourth GNSS signal transmitted by the fourth GNSS satellite.

The method may comprise accumulating the plurality of GNSS measurements over time (for example, in a memory of the static GNSS receiver). Alternatively, the method may comprise calculating a measurement difference each time (at least) two pseudoranges are obtained, and accumulating the measurement differences over time (for example, in the memory).

Optionally: the plurality of GNSS measurements comprises third GNSS measurements, wherein the third GNSS measurements are made by the static GNSS receiver at a third time and comprise a fifth pseudorange associated with a fifth GNSS satellite and a sixth pseudorange associated with a sixth GNSS satellite, wherein the fifth GNSS satellite and the sixth GNSS satellite are different satellites, wherein the fifth GNSS satellite and the sixth GNSS satellite are observed by the static GNSS receiver at the third time; the third time is different to the second time and the first time; and the plurality of differences comprises a third difference calculated between the fifth pseudorange and the sixth pseudorange.

The fifth GNSS satellite and the sixth GNSS satellite may be in the same GNSS constellation.

Although the GNSS satellites observed by the static GNSS receiver at the third time are distinct from one another, one or more of the GNSS satellites observed at the third time may be the same satellites as one or more of the GNSS satellites observed at the first time and/or the second time. For example, one or both of the fifth GNSS satellite and the sixth GNSS satellite may be the same satellite(s) as one or both of the first GNSS satellite and the second GNSS satellite, and/or one or both of the third GNSS satellite and the fourth GNSS satellite.

The position for the static GNSS receiver may be estimated based at least in part on the first difference, the second difference, and the third difference. The third time may correspond to a third epoch at the static GNSS receiver, different to the first epoch and the second epoch.

The method may further comprise maintaining a count of the number of differences in the plurality of differences, wherein the position is estimated in response to the count exceeding a threshold number of differences. The threshold number may be greater than or equal to three. The threshold number may be greater than three so that the estimation of the position is over-determined.

The method may further comprise: calculating a dilution of precision associated with the plurality of GNSS measurements; comparing the calculated dilution of precision with a dilution of precision threshold; and responsive to the calculated dilution of precision being below the dilution of precision threshold, estimating the position.

The method may further comprise: responsive to the calculated dilution of precision being greater than or equal to the dilution of precision threshold, deferring estimation of the position (for example, continuing to obtain GNSS measurements and continuing to add them to the plurality of GNSS measurements).

The position might be estimated in response to the number of the plurality of calculated differences exceeding a threshold number and the dilution of precision being below a dilution of precision threshold. That is, the position might only be estimated in response to both the threshold number being exceeded and the dilution of precision threshold being met.

The dilution of precision may be recalculated each time fresh GNSS measurements and/or a fresh GNSS measurement difference become available.

In some examples, the dilution of precision may be the position dilution of precision. In other examples, the dilution of precision may be the geometric dilution of precision, the time dilution of precision, the horizontal dilution of precision, or the vertical dilution of precision. The dilution of precision threshold may be less than five, preferably less than three, more preferably less than two.

By estimating the position in response to the calculated dilution of precision being below the dilution of precision threshold, the position may be estimated once the geometry of the obtained plurality of GNSS measurements is of sufficient quality. This may help to reduce the positioning error of the estimated position.

The first time may correspond to a first epoch at the static GNSS receiver and the second time may correspond to a second epoch at the static GNSS receiver, wherein no GNSS measurement difference is calculated for a fourth time, corresponding to a fourth epoch at the static GNSS receiver, wherein the fourth time is between the first time and the second time. Hence, the first difference is calculated for the first time (first epoch), a difference is not calculated for the fourth time (fourth epoch), and the second difference is calculated for the second time (second epoch).

The position of the static GNSS receiver can be estimated without requiring that, for every epoch, at least two pseudoranges, each associated with different satellites seen at the same epoch, are obtained by the static GNSS receiver. For example, the static GNSS receiver may wait to calculate a GNSS measurement difference (one of the plurality of GNSS measurement differences) until an epoch in which the static GNSS receiver obtains at least two pseudoranges.

In some examples, zero GNSS satellites are observed, or one GNSS satellite is observed, by the static GNSS receiver at the fourth time.

At the fourth time, there may be too few GNSS satellites visible to the static GNSS receiver to be able to calculate a GNSS measurement difference using GNSS measurements made at the fourth time. Hence, the fourth epoch may be "skipped", and the static GNSS receiver may wait until an epoch in which two GNSS satellites are observed by the static GNSS receiver, so that two pseudoranges can be made by the static GNSS receiver.

Optionally, one or both of the first GNSS satellite and the second GNSS satellite are the same satellite(s) as one or both of the third GNSS satellite and the fourth GNSS satellite. In particular, the first GNSS satellite and the second GNSS satellite may be the same two satellites as the third GNSS satellite and fourth GNSS satellite.

Since measurement differences are accumulated over a period of time, it is possible that the same pair of satellites may be observed at the first time and the second time (for example, at first and second epochs). Consequently, unlike conventional GNSS positioning techniques, in which each GNSS satellite signal contributes just one pseudorange to the estimation of the position, according to examples of the present method, multiple pseudoranges from the same (pairs of) satellite signals can be exploited in the estimation of the position.

When using GNSS measurements from the same satellites at two different times, it may be advantageous to ensure a certain minimum time interval between the two times. Otherwise, the measurements may be highly correlated and the geometry of the satellites may be poor—for example, a dilution of precision may be high. Accordingly, the method may comprise: detecting that the first GNSS satellite and the second GNSS satellite are the same satellites as the third GNSS satellite and the fourth GNSS satellite; determining a time difference between the first time and the second time; and comparing the time difference with a threshold time difference, wherein the position is estimated based on the first difference and the second difference in response to the time difference exceeding the threshold time difference. Otherwise, if two pairs of pseudoranges are obtained for the same pair of GNSS satellite signals, for respective times separated by a time interval shorter than the threshold time difference, the method may comprise discarding one of the pairs of pseudoranges.

Alternatively or in addition, it may be advantageous to ensure that angular separation between line of sight vectors, from the static GNSS receiver to the same satellite at two different times, exceeds a threshold angular separation. The threshold angular separation may be 2°, 5°, 10°, or 15°, for example. Accordingly, the method may comprise: detecting that one or both of the first GNSS satellite and the second GNSS satellite are the same satellites as one or both of the third GNSS satellite and the fourth GNSS satellite; determining angular separation of the same satellites between the first time and the second time; and comparing the angular separation with a threshold angular separation, wherein the position is estimated based on the first difference and the second difference in response to the angular separation exceeding the threshold angular separation. Otherwise, if the angular separation between the line of sight vectors for the same satellite at the two different times is smaller than the threshold angular separation, the method may comprise discarding the pseudoranges obtained for that satellite (and any associated pseudorange differences, calculated using those pseudoranges).

The first GNSS measurements may comprise a seventh pseudorange associated with a seventh GNSS satellite observed by the static GNSS receiver at the first time, wherein the plurality of differences optionally comprises the first difference, and a first additional difference calculated between the first pseudorange and the seventh pseudorange.

The present method is thus not limited to the use of two pseudoranges for each time/epoch. When additional pseudoranges are available, additional between-satellite single differences can be calculated and used in the position estimation. More generally, for one or more pseudoranges obtained at one time, if N pseudoranges are obtained from separate GNSS satellites in a single GNSS constellation at any one time, with $N \geq 1$, then $N-1$ independent between-satellite single differences can be calculated. The number of differences calculated may also depend on the number, M, of GNSS constellations that pseudoranges are obtained from at any one time. In such an example, for one or more pseudoranges obtained at one time, if N pseudoranges are obtained from separate GNSS satellites in M GNSS constellations at any one time, with N, $M \geq 1$, then $N-M$ independent between-satellite single differences can be calculated.

The position of the static GNSS receiver may be estimated based at least in part on the first difference, the second difference, and the first additional difference. The GNSS measurements made at any (or every) epoch may comprise two or more pseudoranges. For example, the second GNSS measurements may comprise three pseudoranges obtained from three separate satellites in the same GNSS constellation, such that two GNSS measurement differences can be calculated from the second GNSS measurements.

The static GNSS receiver may be a static GNSS timing receiver. The static GNSS timing receiver is a GNSS receiver whose primary purpose is to output timing data, such as a precise local time at the GNSS receiver. The static GNSS timing receiver has a timing mode in which it calculates time and does not calculate position. The presently summarised method may be performed when the static GNSS timing receiver is in a self-survey mode. The static GNSS timing receiver may enter the self-survey mode before entering the timing mode.

The method may further comprise: obtaining at least one first further GNSS measurement made by the static GNSS receiver at a fifth time after the position has been calculated;

and calculating a local time at the static GNSS receiver using the estimated position and the at least one first further GNSS measurement.

The method may comprise fixing and/or storing the estimated position of the GNSS receiver, for use in subsequent time calculations. The at least one further GNSS measurement may comprise a pseudorange and/or a carrier-range. The fifth time may correspond to a fifth epoch at the static GNSS receiver, different to the first epoch, the second epoch, the third epoch, and the fourth epoch.

At least one GNSS satellite is observed by the static GNSS receiver at the fifth time, in order to obtain at least one GNSS measurement, in order to calculate the local time once the position of the GNSS receiver has been estimated. If more than one GNSS satellite is observed by the static GNSS receiver at the fifth time, a more accurate time can be calculated, as the estimation is over-determined and the effect of noise in the calculation can be reduced.

The method steps of obtaining the plurality of GNSS measurements, calculating the dilution of precision using the plurality of GNSS measurements, calculating the plurality of differences, and estimating the position of the static GNSS receiver may be performed by the static GNSS receiver in self-survey mode. The static GNSS receiver may stay in self-survey mode for a fixed duration. The static GNSS receiver may refine the position estimate by iteratively repeating the aforementioned method steps, until the static GNSS receiver stops operating in self-survey mode. Following the completion of self-survey mode, the static GNSS receiver may operate in timing mode. In timing mode, the static GNSS receiver performs steps of obtaining the first further GNSS measurement (at least), and calculating the local time for the fifth epoch (fifth time). The local time can be calculated at the fifth time using a first local clock error. The first local clock error can be calculated using the estimated position of the GNSS receiver and the at least one first further GNSS measurement made by the static GNSS receiver at the fifth time. When in timing mode, the static GNSS receiver calculates the local time for every epoch after the position has been calculated, if at least one GNSS measurement made by the static GNSS receiver at that epoch can be obtained. For example, a second local time at the static GNSS receiver can be calculated at a sixth time using a second local clock error. The second local clock error can be calculated using the estimated position of the GNSS receiver and at least one second further GNSS measurement made by the static GNSS receiver at the sixth time, wherein the sixth time may be later than the fifth time. The at least one second further GNSS measurement may comprise a pseudorange and/or a carrier-range.

The static GNSS receiver may exit timing mode and return to self-survey mode responsive to a detection of a relocation of the GNSS receiver. The static GNSS receiver may return to self-survey mode to re-estimate its position, in order to calculate an accurate local time subsequently, once self-survey mode is completed and the static GNSS receiver resumes the timing mode.

The position may be calculated by a navigation filter. The navigation filter may be a recursive state estimator, such as a Kalman filter. The Kalman filter may estimate and then refine the position estimate over a fixed duration. In some examples, the fixed duration may be 24 hours. In some other examples, the fixed duration may be longer than 24 hours.

Also provided is a static GNSS receiver, comprising:

a signal processing unit, configured to track GNSS signals and produce GNSS measurements from the GNSS signals; and

at least one processor, configured to:

obtain from the signal processing unit a plurality of GNSS measurements, the plurality of GNSS measurements comprising first GNSS measurements and second GNSS measurements, wherein the first GNSS measurements are made by the signal processing unit at a first time and comprise a first pseudorange associated with a first GNSS satellite and a second pseudorange associated with a second GNSS satellite, wherein the first satellite and the second satellite are different satellites, wherein the first GNSS satellite and the second GNSS satellite are observed by the static GNSS receiver at the first time, wherein the second GNSS measurements are made by the signal processing unit at a second time and comprise a third pseudorange associated with a third GNSS satellite and a fourth pseudorange associated with a fourth GNSS satellite, wherein the third satellite and the fourth satellite are different satellites, wherein the third GNSS satellite and the fourth GNSS satellite are observed by the static GNSS receiver at the second time, wherein the second time is different to the first time;

calculate a plurality of differences comprising a first difference and a second difference, wherein the first difference is calculated between the first pseudorange and the second pseudorange, and wherein the second difference is calculated between the third pseudorange and the fourth pseudorange; and estimate the position of the static GNSS receiver based at least in part on the plurality of differences.

The static GNSS receiver may be a static GNSS timing receiver—a GNSS receiver whose primary purpose is to output timing data, such as a precise local time at the GNSS receiver. The GNSS timing receiver has a timing mode in which it calculates time and does not calculate position. The processor may further have a self-survey mode, in which it is configured to obtain the plurality of GNSS measurements, calculate the plurality of differences, and estimate the position of the static GNSS receiver.

The static GNSS receiver may further comprise an RF front-end. The RF front-end may be configured to receive GNSS signals via an antenna. The signal processing unit may be configured to make GNSS measurements (pseudorange measurements, and optionally carrier range measurements) on the GNSS signals received by the RF front-end.

Also provided is a base station for a communications network, comprising a static GNSS receiver as summarised above. The base station may be part of a cellular communications network. The cellular communications network may be a 5G wireless network.

The base station may be an indoor base station. Traditionally, GNSS timing receivers are not used in indoor base stations, because it is understood that availability of GNSS signals is often limited indoors, such that the self-survey mode may fail to establish the position of the receiver. However, examples according to the present disclosure can enable a GNSS timing receiver to be used successfully indoors, by supporting a self-survey mode that has weaker constraints on the minimum number of GNSS signals per epoch.

Also provided is a computer program comprising computer program code configured to cause one or more physical computing devices to carry out all the steps of a method as summarised above when the computer program is executed by said one or more physical computing devices. The one or more physical computing devices may comprise or consist of one or more processors of a GNSS receiver. The computer program may be stored on a computer-readable storage medium (optionally non-transitory).

BRIEF DESCRIPTION OF THE DRAWINGS

The invention will now be described by way of example with reference to the accompanying drawings, in which.

Figure 1:
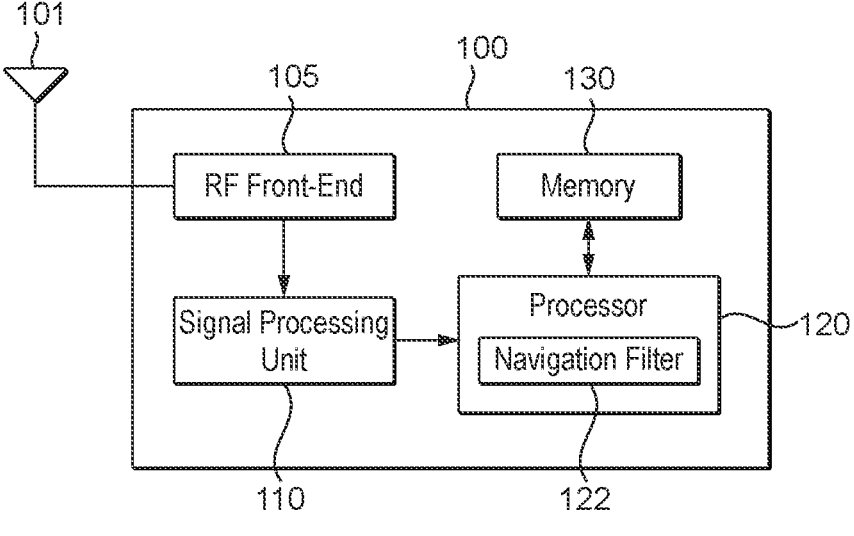
FIG. 1 is a schematic block diagram of a device according to an example, comprising a static GNSS receiver.

It should be noted that these figures are diagrammatic and not drawn to scale. Relative dimensions and proportions of parts of these figures have been shown exaggerated or reduced in size, for the sake of clarity and convenience in the drawings.

DETAILED DESCRIPTION

Reference will now be made in detail to examples according to the present disclosure, which are illustrated in the accompanying drawings. The scope of the present disclosure should not be construed as being limited to the descriptions given in this section; other examples may have different forms. These and other features, aspects, and advantages of the apparatus, systems and methods of the present disclosure will become better understood from the following description, appended claims, and accompanying drawings. It should be understood that the same reference numerals are used throughout the Figures to indicate the same or similar parts.

FIG. 1 is a schematic block diagram of a device according to an example. The device comprises a GNSS antenna 101 and a GNSS receiver 100. The GNSS antenna 101 is configured to receive GNSS signals. It may be configured to receive GNSS signals from a single GNSS constellation (for example, GPS), or it may be configured to receive GNSS signals from multiple constellations (for example, GPS, Galileo, GLONASS, and/or BeiDou). The GNSS receiver 100 comprises an RF front-end 105, a signal processing unit 110, a processor 120, and a memory 130. The RF front-end 105 is configured to receive GNSS signals via the GNSS antenna 101, and to output them to the signal processing unit 110. The RF front-end 105 is configured to down-convert and digitise the satellite signals received via the antenna 101. The RF front-end essentially conditions the signals for subsequent signal processing. Other typical tasks performed by the front-end include filtering, amplification and automatic gain control. The satellite signals received at the RF front-end 105 via the antenna 101 include at least one ranging signal, such as an L1 C/A signal, for each of a plurality of satellites. The signal processing unit 110 is configured to track the received GNSS signals—for example, in frequency, delay (code-phase) and carrier phase—and to produce GNSS measurements from the received GNSS signals.

The code-phase represents the fine component of the Time of Transmission (ToT) of an instant in the GNSS signal. The rest of the components can be determined by counting the code epochs from the preceding data bit edge, the bits from the preceding data word boundary, and the words since the preceding sub-frame boundary, by knowing the temporal length of each code epoch, data bit and data word and by extracting the subframe ToT that is supplied in the data. The Time of Receipt (ToR) that corresponds to the reception of this instant in the GNSS signal is latched into a register at the same time as all of the ToT components are latched into registers. This allows the Time of Flight (ToF) of the signal to be estimated as the difference between the ToR and ToT. When multiplied by the speed of light, this constitutes an estimate of the range to the satellite which is known as a pseudorange estimate. It is called this because there is known to be an error in this range estimate caused by the error in the receiver clock which is present in all of the pseudoranges measured at the same instant.

The processor 120 is configured to process the GNSS measurements obtained from the signal processing unit 110. While it should be understood that more than one processor may be present within the GNSS receiver 100 for implementing methods according to the present disclosure, for the purposes of the present description it is assumed that there is only one processor 120, as depicted in FIG. 1. In the present example, the processor implements a navigation filter 122, for example a Kalman filter (KF). This is an example of a recursive state estimator. At each of a plurality of time increments (epochs), the navigation filter 122 is able to estimate the current value of a state vector of state variables, optionally with their associated uncertainties. The estimate for the current state vector is based on the estimated state from the previous epoch and the current measurements. In the context of positioning, conventionally, the state variables estimated by the navigation filter 122 include position and time variables. The memory 130 is in communication with the processor 120. The memory 130 is configured to store software/firmware to be executed by the processor 120. The software/firmware is configured to control the processor 120 to carry out a processing method according to an example. The memory may also be configured to store data that is used as input to the processor 120 and/or to store data that is output by the processor 120.

Figure 2:
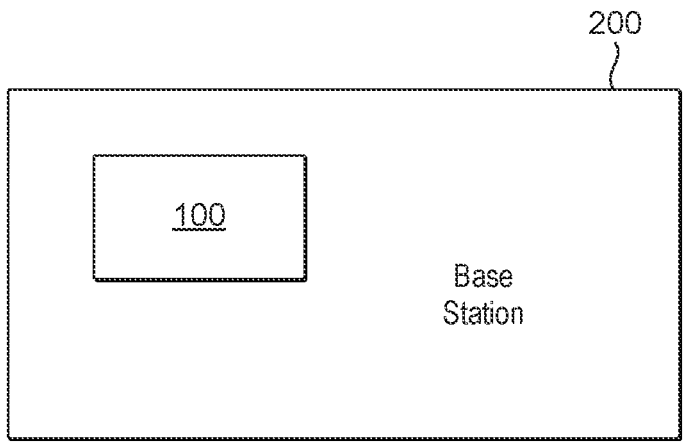
FIG. 2 is a block diagram showing the GNSS receiver of FIG. 1 installed in a cellular base station.

The GNSS receiver is a static GNSS receiver, meaning that it is designed not to be moved during normal operation. In particular, the GNSS receiver of the present example is a timing GNSS receiver for use in a cellular base station. Its purpose is to provide an accurate timing reference, to synchronise the base station with the rest of the cellular network to which the base station belongs. Modern cellular networks (for example, 5G networks) require the transmissions of all base stations to be synchronised; therefore, it is known to provide a GNSS receiver in each cellular base station, such that all base stations can synchronise accurately to GNSS time (which is itself highly accurate and stable). FIG. 2 shows the GNSS receiver 100 of FIG. 1 installed in a cellular base station 200. (For simplicity, the antenna 101 is not shown.)

Figure 3A:
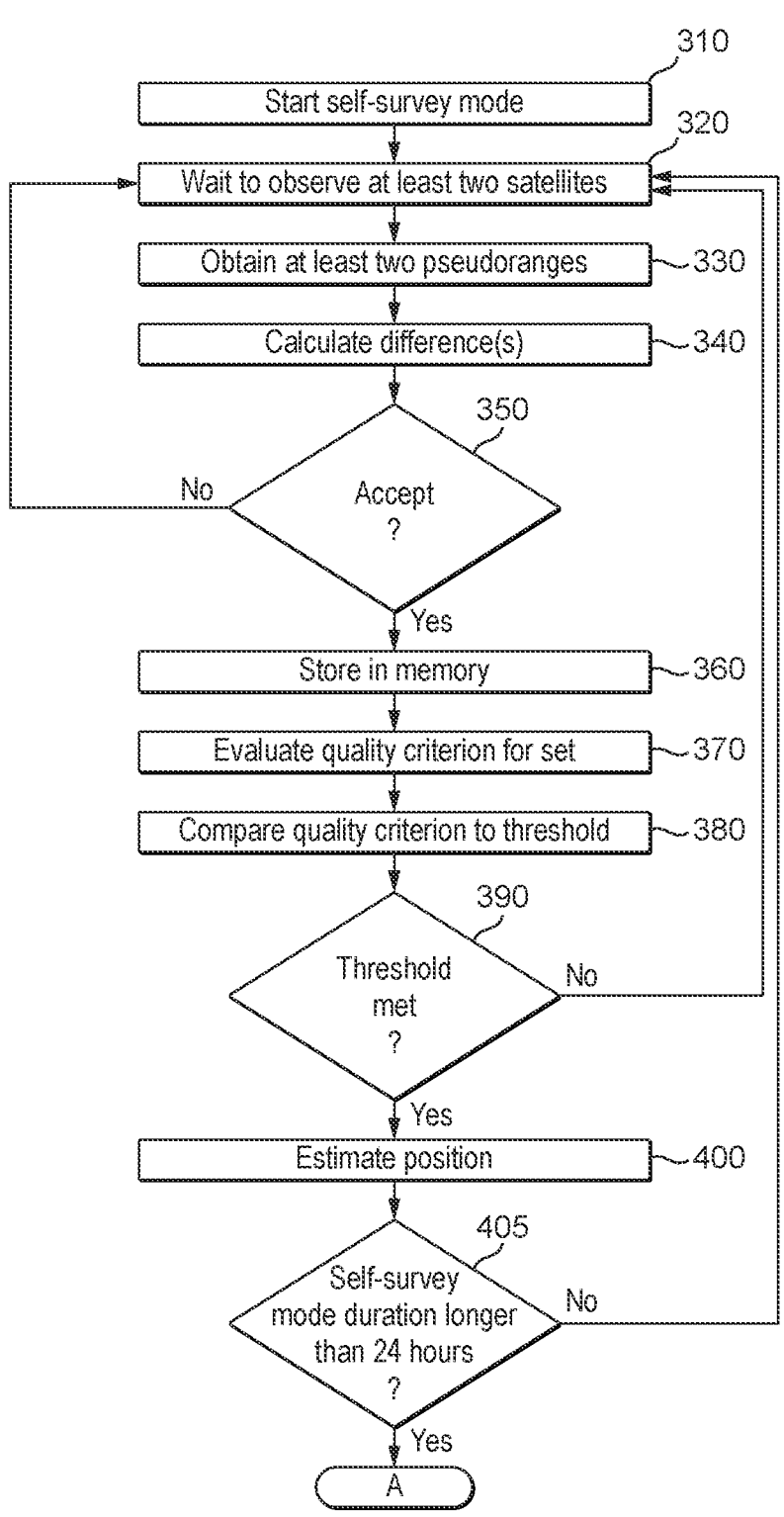
FIGS. 3A-B are flowcharts illustrating a method performed by the GNSS receiver of FIG. 1 according to an example.
Figure 3B:
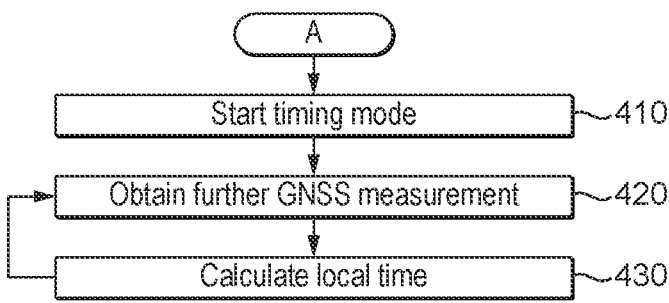

FIGS. 3A-3B are flowcharts illustrating a method performed by the processor 120 of the GNSS receiver 100 of FIG. 1, according to an example. In step 310, the processor 120 enters a self-survey mode. This mode may be selected automatically upon initial start-up of the GNSS receiver— for example, upon detecting connection to a power source for the first time. Alternatively or in addition, it may be selected manually—for example, by a user or engineer, when commissioning or configuring the base station 200. According to the present example, the processor 120 operates in the self-survey mode for a fixed length of time. The fixed length of time may be configurable. In the present example, it is set to 24 hours by default. In the self-survey mode, the GNSS receiver is configured to determine its position using GNSS signals. The determined position will be used later, in the timing mode, to constrain the timing calculation, so that a local time can be calculated from just one GNSS measurement. Thus, in the self-survey mode, the position coordinates (as well as the local clock error) are unknown, variable quantities, and the processor will attempt to solve for the position coordinates by obtaining and processing GNSS measurements. In the timing mode, the position coordinates are treated as known, fixed quantities. In the timing mode, the processor will attempt to solve for the local clock error while holding the position coordinates fixed. The local clock error is estimated in order to correct the receiver clock, so that a more accurate local time at the GNSS receiver 100 is calculated.

In the self-survey mode, the GNSS receiver 100 collects pseudorange differences to enable it to calculate its position. Each pseudorange difference is calculated as the difference between two pseudoranges, for two respective satellites (from the same GNSS constellation) observed by the GNSS receiver at a given moment in time. The signal processing unit 110 of the GNSS receiver 100 attempts to make pseudorange measurements at every epoch. However, because the base station may be positioned at a location with poor satellite visibility, this is not always successful.

In some epochs, the signal processing unit 110 might not be able to make any GNSS measurements (for example, because no satellites are currently in view, or because the carrier to noise ratio for all in-view satellites is too low). In some epochs, the signal processing unit 110 may be able to make a single pseudorange measurement, but unable to make more than one pseudorange measurement. Such isolated pseudorange measurements are not used in the self-survey mode, according to the present example. It is difficult to derive an accurate position estimate by accumulating individual, isolated pseudorange measurements. In principle, this approach could be used if the GNSS receiver had a perfectly stable local clock. However, in practice, all clocks drift to some extent, and it would be very expensive to provide the GNSS receiver with a clock that is sufficiently stable (that is, has low enough drift) to support estimation of the position from individual, isolated pseudorange measurements. Without such a solution, the local clock will drift by an unknown and non-negligible amount between the different epochs in which the isolated pseudorange measurements are made. This source of error will corrupt the calculation, preventing accurate estimation of the position.

The present inventor has recognised that the timing drift of the local clock can be eliminated from the calculations by making comparisons between (at least) two pseudorange measurements made in the same epoch. The difference between such pseudoranges is independent of the local clock drift. The present inventor has recognised that this advantage can be exploited to allow the (differential) measurements to be collected across epochs that are widely spaced in time, and combined to calculate the position estimate.

The present example discards isolated individual GNSS measurements, and requires a minimum of two pseudoranges to be measured in the same epoch, in order for that epoch to be useful. Note that this is still an improvement on a conventional approach to GNSS positioning. In the conventional approach, the GNSS receiver would require at least four pseudorange measurements, because it would be configured to calculate (or update) its position from pseudorange measurements that are all gathered in one epoch.

In step 320, the processor 120 waits until at least two GNSS satellites are observable in the same epoch. In step 330, the processor 120 obtains first GNSS measurements from the signal processing unit 110. The first GNSS measurements are all associated with the same epoch (here designated the "first epoch") and they include at least a first pseudorange, associated with a first GNSS satellite, and a second pseudorange, associated with a second, different GNSS satellite. These two satellites have been observed by the GNSS receiver at a first time (that is, the first epoch). In this example, the first GNSS satellite and the second GNSS satellite are in the same GNSS constellation. However, this is a non-limiting example —the first GNSS satellite and the second GNSS satellite may belong to different GNSS constellations.

In step 340, the processor 120 calculates a first difference between the first pseudorange and the second pseudorange. The processor may perform one or more checks to determine whether the first and second pseudoranges (and therefore the first difference) should be used in the eventual position estimation. These checks will be described in greater detail below. In step 350, the processor determines, based on the results of the one or more checks, whether to accept the first and second pseudoranges (and first difference). If it accepts the measurements, the processor 120 stores the first difference in the memory 130 (step 360). If, in step 350, the processor decides not to accept the first and second pseudoranges (and first difference), the method returns to step 320, and the processor waits again until the next epoch in which the signal processing unit 110 is able to make at least two pseudorange measurements.

After the first difference has been stored in the memory 130, in step 360, the processor proceeds to step 370. In this step, it evaluates one or more quality criteria for the set of differences stored so far in the memory 130. In step 380, the processor compares each quality criterion to an appropriate predetermined threshold, to decide whether the set of differences stored in the memory is suitable for calculating an accurate position fix. The design of suitable quality criteria will be described in greater detail later, below. In step 390, based on the output of the comparison step 380, the processor 120 determines whether the evaluated criteria meet the respective threshold levels to proceed with the position estimation.

In the first iteration of steps 370, 380 and 390, only one pseudorange difference (the first difference) has been stored in the memory. In general, the processor will be unable to calculate a position fix from a single pseudorange difference; therefore, none of the quality criteria will meet the necessary threshold. The method therefore returns to step 320, and the processor waits until an epoch in which at least two pseudorange measurements are made successfully by the signal processing unit 110. Several epochs may pass before this happens. That is, there may be several epochs in which the number of successful pseudorange measurements is one or none.

The next time that at least two GNSS satellites are observable at the GNSS receiver 100, the processor proceeds again to step 330. In this step, as before, the processor 120 obtains GNSS measurements from the signal processing unit 110. For this second iteration of step 330, the measurements are denoted second GNSS measurements. The second GNSS measurements are all associated with the same epoch (here designated the "second epoch") and they include at least a third pseudorange and a fourth pseudorange. The third pseudorange is measured from a GNSS signal of a third GNSS satellite. Likewise, the fourth pseudorange is measured from a GNSS signal of a fourth GNSS satellite. The third and fourth GNSS satellites are different satellites.

However, either of them may be the same satellite as one of the first and second GNSS satellites. Indeed, it is possible that they are exactly the same pair of GNSS satellites as the first and second GNSS satellites, observed at the first epoch. In this example, the third GNSS satellite and the fourth GNSS satellite are in the same GNSS constellation. It is not necessary for the third GNSS satellite and the fourth GNSS satellite to be in the same GNSS constellation as the first GNSS satellite and the second GNSS satellite.

The method proceeds again to step 340, in which the processor 120 calculates the difference (here denoted the "second difference") between the third pseudorange and the fourth pseudorange. In step 350, the processor determines whether to accept the third and fourth pseudoranges and the associated second difference. If it rejects them, the method returns to step 320, to wait for an epoch in which two other (better) pseudoranges can be measured. For now, without loss of generality, it will be assumed that the processor accepts the third and fourth pseudoranges and the associated (second) difference between them. The method proceeds to step 360, in which the processor stores the second difference in the memory 130.

The method proceeds again to steps 370, 380, and 390, to determine whether the set of differences stored in the memory is appropriate for calculating a position estimate. If, in step 390, the processor determines that the evaluated criteria do not meet the relevant thresholds, the method returns to step 320 for a further iteration. The next time that two or more pseudorange measurements are possible, the method proceeds to step 330. The processor 120 obtains GNSS measurements (designated "third GNSS measurements") from the signal processing unit 110. The third GNSS measurements are made at a third time (third epoch) and include a fifth pseudorange associated with a GNSS signal from a fifth GNSS satellite and a sixth pseudorange associated with a GNSS signal from a sixth GNSS satellite. Once again, the fifth and sixth satellites are different satellites; however, either of them may be the same satellite as one of the first, second, third, or fourth satellites. In this example, the fifth GNSS satellite and the sixth GNSS satellite are in the same GNSS constellation. However, it is not necessary for the fifth GNSS satellite and the sixth GNSS satellite to be in the same GNSS constellation as the third GNSS satellite and the fourth GNSS satellite and/or the first GNSS satellite and the second GNSS satellite.

In this iteration, in step 340, a difference (denoted the "third difference") is calculated between the fifth pseudorange and the sixth pseudorange. For simplicity it will be assumed that the pseudoranges and resulting third difference are accepted in step 350, and the processor 120 stores the third difference in the memory, in step 360. The method proceeds to evaluate the quality criteria in 370 and compares them to the relevant thresholds in step 380.

Eventually, after a sufficient number of iterations of steps 330-380, the processor 120 determines in step 390 that the threshold criteria are met. This means that the set of pseudorange differences stored in the memory 130 is considered suitable for calculating a position fix. The method proceeds from step 390 to step 400, at which the processor 120 estimates the position of the static GNSS receiver 100, based at least in part on the plurality of pseudorange differences stored in the memory 130—that is, based on (at least) the first, second, and third differences. The position estimation comprises a multilateration calculation, similar to that used conventionally for calculating a GNSS position fix. Conventionally, a set of simultaneous equations is constructed that relates the pseudorange measurements to the position coordinates and a local clock error in the GNSS receiver 100. The set of simultaneous equations is solved to calculate the position coordinates and the local clock error. In the present example, a modified set of simultaneous equations is constructed that relates the accumulated pseudorange differences (including at least the first, second, and third differences) to the position coordinates. This modified set of simultaneous equations is solved by the Kalman filter 122 to calculate the position coordinates. The accumulated pseudorange differences are input to the Kalman filter 122. When the position is estimated for the first time, the Kalman filter 122 outputs a first state vector, comprising first position coordinates of the GNSS receiver 100. As a result of the modification to the set of simultaneous equations according to the present example, the local clock error is not estimated by the Kalman filter 122. The first, second, and third differences, and hence the estimated position of the GNSS receiver 100, are independent of the local clock error.

According to the present example, once the position of the static GNSS receiver 100 has been estimated successfully in step 400, steps 320-400 are performed iteratively by the processor 120 to further refine and/or improve the reliability of the position estimate. The position estimate continues to be refined until the processor 120 stops operating in the self-survey mode. Steps 320-400 are performed iteratively for a fixed length of time (for example, 24 hours) in order to estimate and then update the state vector, and hence the position estimate. For example, in order to update the first state vector (in particular, to update the first position coordinates), at least three independent pseudorange differences and the first state vector are input into the Kalman filter 122. The at least three independent pseudorange differences are each associated with GNSS signals received by the GNSS receiver 100 after the first state vector has been estimated. The Kalman filter 122 then outputs a second state vector, comprising second position coordinates of the GNSS receiver 100. The second state vector is an update of the first state vector. The intention is that the processor 120 produces a more accurate estimate of the position coordinates of the GNSS receiver 100 (based on the additional measurements) with each iteration of the method steps 320-400.

Once the processor stops operating in the self-survey mode, the method proceeds to step 410. In this step, the processor enters the timing mode. The position is regarded as fixed and the processor only calculates a time solution. In particular, in step 420, the processor 120 obtains a further GNSS measurement (made by the signal processing unit 110 on a GNSS signal received in a further epoch). The further GNSS measurement comprises a single pseudorange. In this mode, a single pseudorange is sufficient. The estimation of time (at a known position) is a one-dimensional problem; therefore, one GNSS satellite observation is sufficient to solve for time. The processor 120 calculates the local clock error at the GNSS receiver, based on the further GNSS measurement and the position estimated previously in step 400. The processor 120 then corrects the receiver clock by compensating for the local clock error, in order to calculate the local time at the GNSS receiver 100 in step 430. Once the local time has been calculated, the processor returns to step 420, to perform steps 420-430 iteratively, in order to continually provide estimates of the local time at the GNSS receiver.

Note that the further GNSS measurement obtained in step 420 can be derived from any subsequent epoch, and there is no need to obtain a pair of pseudoranges or to calculate a difference between pseudoranges. This is because the timing drift of the local clock of the GNSS receiver is no longer a factor in the calculation of the local time. The calculation in step 430 relies only on the position coordinates calculated in the final iteration of step 400.

Because the GNSS receiver 100 is static (that is, not moving), the last position calculated (when the processor is operating in self-survey mode) in step 400 remains valid indefinitely.

If the GNSS receiver 100 is moved to a different location, the self-survey mode can be re-entered (with the method beginning again at step 310). This can be triggered manually, by a user or engineer. Alternatively, the change of location could be detected automatically, by detecting (in the timing mode) when a local time solution calculated in step 430 is inconsistent with a local time solution calculated in an earlier iteration of that step. When the GNSS receiver 100 is moved, it will create a step shift in the local time calculated in step 430. Such a step shift may be detected by comparing the calculated local time with a predicted time according to the local clock of the GNSS receiver. This will allow large changes in position to be detected automatically. (However, small changes in position might be indistinguishable from the effect of clock drift of the local clock in the GNSS receiver.)

The example above described calculating a single pseudorange difference for each epoch—namely: a first difference at a first epoch; a second difference at a second epoch; and a third difference at a third epoch. However, if more than two GNSS satellites are observable at the same epoch, more differences can be formed. For example, if three GNSS satellites A, B, and C in the same GNSS constellation are observable, such that three pseudoranges can be obtained, then two differences can be calculated from respective pairs of the three satellites (for example, A–B and B–C). A third difference (C–A) could be formed, but it would not be independent of the first two. More generally for N, M≥1, if N pseudoranges are obtained from separate GNSS satellites in M GNSS constellations at any one time, then N–M independent differences are calculated.

If more than two pseudoranges can be obtained for a single epoch, then it may reduce the number of epochs over which measurements are necessary before a position can be calculated. In general, if no other information is available, at least three independent pseudorange differences will be required, at a minimum, in order to estimate the position by trilateration in step 400. These three differences could be gathered over three epochs, two epochs, or possibly even together in one epoch (if a sufficient number of GNSS satellites are visible at the same time.) However, even if the minimum number of measurements can be acquired in a single epoch, it may still be beneficial to accumulate within-epoch differences for multiple epochs. Each additional difference measurement adds further information for calculating the position estimate. When more than the minimum number of measurement differences are available, the additional measurement differences serve to over-determine the solution. This can improve the accuracy of the position estimate (for example by finding a least-squares solution from all of the measurement differences).

As mentioned briefly above, the processor 120 may perform one or more checks to determine whether the pseudoranges obtained in step 330 (and their difference, calculated in step 340) are suitable for use in the position estimation. According to the present example, a check is performed if any two of the pseudoranges obtained for the present epoch relate to two GNSS satellites whose pseudoranges were used to calculate a difference in an earlier epoch. For example, if the third GNSS satellite and the fourth GNSS satellite, observed at the second epoch, are the same GNSS satellites as the first GNSS satellite and the second GNSS satellite, observed at the first epoch, then the check will be performed. The purpose of the check is to determine whether the pseudoranges are sufficiently uncorrelated. If highly correlated pseudoranges are used, it may reduce the accuracy of the resulting position estimate. This can be established in various ways.

According to one implementation, the processor 120 checks the elapsed time between the first and second epochs. Provided the elapsed time is above a predetermined minimum threshold, the third pseudorange (and second difference) will be accepted, in step 350.

According to another implementation, the processor 120 checks the angular separation between (i) the line of sight vector of the first satellite at the first epoch and (ii) the line of sight vector of the first satellite at the second epoch (which is the line of sight vector of the "third satellite", in this example). The angular separation should be above a predetermined minimum threshold, to ensure that the measurements are sufficiently uncorrelated. Provided the angular separation is above the threshold, the processor will accept the third pseudorange (and second difference), in step 350.

According to another implementation, the processor checks a position dilution of precision measure. The position dilution of precision measure is computed based on line of sight vectors to all GNSS satellites associated with the pseudorange difference(s) calculated in step 330 for the current iteration of method steps 320-350. Provided the position dilution of precision measure is below a predetermined threshold, the processor 120 accepts the third pseudorange (and second difference), in step 350.

As also mentioned above, the processor evaluates one or more quality criteria for the overall set of differences accumulated in the memory 130 (see step 370). According to the present example, the processor 120 maintains a count of the number of differences accumulated so far in the memory 130. The number of differences provides a quality metric in that the position fix can be expected to become more accurate as more measurements and more differences become available. In step 380, the processor compares the count to a predetermined threshold, defining the minimum number of pseudorange differences that is acceptable for calculating a reliable position estimate. If the count is greater than the threshold, then the processor declares, in step 390, that the threshold is met.

In addition, in step 370 the processor may calculate a dilution of precision (for example, position dilution of precision), for the set of differences stored in the memory 130. The position dilution of precision measure is computed based on line of sight vectors to all GNSS satellites associated with the set of differences stored in the memory 130. In step 380, the processor compares the calculated dilution of precision with a predetermined threshold. If the calculated dilution of precision is below the predetermined threshold, then the processor declares, in step 390, that the threshold is met (since lower values of dilution of precision are associated with greater accuracy). In the conventional approach, even with four pseudoranges being available in the same epoch, the position estimate might not be accurate, as the dilution of precision associated with the GNSS satellites corresponding to these pseudoranges may be too high. The position dilution of precision, based on the geometrical spread of the GNSS satellites in the sky as seen from the GNSS antenna 101, represents a multiplicative factor in the position error. By waiting to estimate the position in step 400 until the calculated dilution of precision is below the predetermined threshold, the method facilitates calculation of a more accurate position estimate.

According to the present example, in order to pass the test at step 390, both criteria must be satisfied. That is, the counted number of pseudorange differences must be above the relevant threshold, and the dilution of precision must be below the relevant threshold.

In other examples, just one of these two criteria may be used to assess the set of differences stored in the memory 130. Alternatively or additionally, other criteria may be used.

As explained above, within-epoch pseudorange differences are accumulated over multiple epochs that may be separated widely in time. That is, there may be several (possibly many) epochs between those for which suitable measurements are available. Even if pseudoranges are measured for the same GNSS satellite at multiple epochs, it should be understood that it is not essential that the RF front-end 105 tracks such a GNSS satellite over the intervening epochs. The RF front-end 105 may acquire and lose signal lock on the satellite several times in between the epochs for which a pseudorange difference is calculated.

It should be understood that the above-mentioned examples illustrate rather than limit the invention, and that those skilled in the art will be able to design many alternative examples without departing from the scope of the appended claims.

For instance, it is not necessary for each pseudorange difference to be calculated between two pseudoranges associated with two GNSS satellites from the same GNSS constellation. For example, the processor 120 may wait until at least two GNSS satellites from any GNSS constellation are observable in the same epoch, before proceeding to step 330. The first GNSS satellite may be in a first GNSS constellation and the second GNSS satellite may be in a second, different GNSS constellation. The third GNSS satellite may be in a third GNSS constellation and the fourth GNSS satellite may be in a fourth GNSS constellation different to the third GNSS constellation. The fifth GNSS satellite may be in a fifth GNSS constellation and the sixth GNSS satellite may be in a sixth GNSS constellation different to the fifth GNSS constellation. One or more of the first and second GNSS constellations may be the same as one or more of the third and fourth GNSS constellations and/or one or more of the fifth and sixth GNSS constellations.

When pseudorange differences are calculated between two pseudoranges associated with two GNSS satellites from different GNSS constellations, an estimate of inter-GNSS biases may be obtained in order to accurately estimate the position of the GNSS receiver 100. The estimate of inter-GNSS biases may include one or more inter-GNSS-constellation time differences. In one example, the inter-GNSS biases may be estimated externally to the Kalman filter 122. In an alternative example, the inter-GNSS biases may be estimated as additional states in the state vector estimated by the Kalman filter 122. However, in order to estimate a larger number of unknown states in the state vector using the Kalman filter 122, the minimum number of pseudorange differences required to calculate the position estimate in step 400 increases.

In the example described above, the processor 120 was configured to calculate differences between pseudoranges in step 340 and to store those differences in the memory 130 in step 360. As an alternative to this, the processor could instead store the "raw" pseudoranges in the memory 130, without calculating differences between them. The processor would then retrieve the raw pseudoranges from the memory 130, and would calculate the differences between them before it calculates the position fix. In this alternative example, steps 370, 380, and 390 may be performed by the processor 120 once the raw pseudoranges had been retrieved from the memory 130, but before the position fix is calculated. Step 350 may be performed by the processor 120 before or after the raw pseudoranges are stored in the memory 130.

As mentioned already above, there may be overlap between the sets of GNSS satellites observed at different epochs. In particular, one of the first and second GNSS satellites may be the same satellite as one of the third and fourth GNSS satellites and/or one of the fifth and sixth GNSS satellites. In one example, the first GNSS satellite may be the same satellite as the third GNSS satellite and the fifth GNSS satellite. In this example, the first GNSS satellite and the second GNSS satellite are in-view of the GNSS receiver 100 at the first time, the first GNSS satellite and the fourth GNSS satellite are in view of the GNSS receiver 100 at the second time, and the first GNSS satellite and the sixth GNSS satellite are in view of the GNSS receiver 100 at the third time.

In a further example, the first GNSS measurements (made at the first epoch) may comprise the first pseudorange associated with the first GNSS satellite, the second pseudorange associated with the second GNSS satellite, and a seventh pseudorange associated with a seventh GNSS satellite. Each satellite is observed by the GNSS receiver 100 at the first time. The first difference, between the first pseudorange and the second pseudorange, and a first additional difference, between the first pseudorange and the seventh pseudorange, may be calculated. The third GNSS satellite and the fourth GNSS satellite may be different to the first GNSS satellite, the second GNSS satellite, and the seventh GNSS satellite. The position of the GNSS receiver 100 may be estimated in step 400 based at least in part on the first difference, the first additional difference, and the second difference.

In the example described above for the GNSS receiver 100 in self-survey mode, it is assumed that all of the position coordinates are unknown. Alternatively, one of the position variables may be known before solving the modified set of simultaneous equations, reducing the complexity of the problem. For example, the altitude of the GNSS receiver 100 may be known, so that the modified set of simultaneous equations only needs to be solved to determine the other two position coordinates—for example, latitude and longitude.

In another example, other information may be available to the processor 120 in order to estimate the position of the GNSS receiver 100. The other information may be derived, for example, from terrestrial positioning signals or signals of opportunity received from one or more terrestrial transmitters. The other information may constrain the simultaneous equations to be solved, so that fewer pseudorange differences obtained from GNSS measurements are required to estimate the position of the GNSS receiver 100.

In another example, the navigation filter 122 might not be a Kalman filter. For example, the navigation filter 122 may be a least squares (LSQ) filter. The LSQ filter may calculate multiple position estimates of the GNSS receiver 100 over a fixed length of time (for example, 24 hours) by repeatedly making a least squares calculation. A mean value of the multiple position estimates may then be calculated to obtain a final position estimate. The final position estimate may then be used to constrain the set of simultaneous equations when the processor 120 is operating in the timing mode (steps 420-430).

In another example, the processor 120 might operate in the self-survey mode until the state vector estimated by the Kalman filter 122 surpasses a threshold number of estimations. For example, the processor 120 may stop operating in the self-survey mode once the state vector has been estimated by the Kalman filter 122 more than five times (after the fifth full iteration of the steps 320-400), optionally more than ten times, optionally more than twenty times.

In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The examples may be implemented by means of hardware comprising several distinct elements. In a device claim enumerating several means, several of these means may be embodied by one and the same item of hardware. The mere fact that certain measures are recited in mutually different dependent claims does not indicate that a combination of these measures cannot be used to advantage. Furthermore, in the appended claims lists comprising "at least one of: A; B; and C" should be interpreted as (A and/or B) and/or C.

In flowcharts, summaries, claims, and descriptions relating to methods, the sequence in which steps are listed is not, in general, intended to be limiting on the order in which they are carried out. The steps may be performed in a different order to that indicated (except where specifically indicated, or where a subsequent step relies on the product of a preceding step). Nevertheless, the order in which the steps are described may in some cases reflect a preferred sequence of operations.

Furthermore, in general, the various examples may be implemented in hardware or special purpose circuits, software, logic or any combination thereof. For example, some aspects may be implemented in hardware, while other aspects may be implemented in firmware or software, which may be executed by a controller, microprocessor or other computing device, although these are not limiting examples. While various aspects described herein may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The examples described herein may be implemented by computer software executable by a data processor of the apparatus, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Examples as discussed herein may be practiced in various components such as integrated circuit modules. The design of integrated circuits is generally a highly automated process. Complex and powerful software tools are available for converting a logic level design into a semiconductor circuit design ready to be etched and formed on a semiconductor substrate.

The invention claimed is:

1. A method of estimating a position of a static GNSS receiver, the method comprising:

obtaining a plurality of GNSS measurements, the plurality of GNSS measurements comprising first GNSS measurements and second GNSS measurements, wherein the first GNSS measurements are made by the static GNSS receiver at a first time and comprise a first pseudorange associated with a first GNSS satellite and a second pseudorange associated with a second GNSS satellite, wherein the first GNSS satellite and the second GNSS satellite are different satellites, wherein the first GNSS satellite and the second GNSS satellite are observed by the static GNSS receiver at the first time, wherein the second GNSS measurements are made by the static GNSS receiver at a second time and comprise a third pseudorange associated with a third GNSS satellite and a fourth pseudorange associated with a fourth GNSS satellite, wherein the third GNSS satellite and the fourth GNSS satellite are different satellites, wherein the third GNSS satellite and the fourth GNSS satellite are observed by the static GNSS receiver at the second time, and wherein the second time is different from the first time;

calculating a plurality of differences comprising a first difference and a second difference, wherein the first difference is calculated between the first pseudorange and the second pseudorange, and wherein the second difference is calculated between the third pseudorange and the fourth pseudorange; and estimating the position of the static GNSS receiver based at least in part on the plurality of differences.

2. The method of claim 1, wherein:

the plurality of GNSS measurements comprises third GNSS measurements, wherein the third GNSS measurements are made by the static GNSS receiver at a third time and comprise a fifth pseudorange associated with a fifth GNSS satellite and a sixth pseudorange associated with a sixth GNSS satellite, wherein the fifth GNSS satellite and the sixth GNSS satellite are different satellites, wherein the fifth GNSS satellite and the sixth GNSS satellite are observed by the static GNSS receiver at the third time;

the third time is different to the second time and the first time; and the plurality of differences comprises a third difference calculated between the fifth pseudorange and the sixth pseudorange.

3. The method of claim 1, further comprising maintaining a count of the number of differences in the plurality of differences, wherein the position is estimated in response to the count exceeding a threshold number of differences.

4. The method of claim 1, further comprising:

calculating a dilution of precision associated with the plurality of GNSS measurements;

comparing the calculated dilution of precision with a dilution of precision threshold; and responsive to the calculated dilution of precision being below the dilution of precision threshold, estimating the position.

5. The method of claim 1, wherein the first time corresponds to a first epoch at the static GNSS receiver and the second time corresponds to a second epoch at the static GNSS receiver, wherein no GNSS measurement difference is calculated for a fourth time, corresponding to a fourth epoch at the static GNSS receiver, wherein the fourth time is between the first time and the second time.

6. The method of claim 5, wherein zero GNSS satellites are observed, or one GNSS satellite is observed, by the static GNSS receiver at the fourth time.

7. The method of claim 1, wherein one or both of the first GNSS satellite and the second GNSS satellite are the same satellite(s) as one or both of the third GNSS satellite and the fourth GNSS satellite.

8. The method of claim 1, wherein the first GNSS measurements comprise a seventh pseudorange associated with a seventh GNSS satellite observed by the static GNSS receiver at the first time, wherein the plurality of differences comprises the first difference, and a first additional difference calculated between the first pseudorange and the seventh pseudorange.

9. The method of claim 1, wherein the static GNSS receiver is a static GNSS timing receiver.

10. The method of claim 1, further comprising:

obtaining at least one first further GNSS measurement made by the static GNSS receiver at a fifth time after the position has been calculated; and calculating a local time at the static GNSS receiver using the estimated position and the at least one first further GNSS measurement.

11. The method of claim 1, wherein the position is calculated by a navigation filter.

12. A static GNSS receiver, comprising:

a signal processing unit, configured to track GNSS signals and produce GNSS measurements from the GNSS signals; and at least one processor, configured to:

obtain from the signal processing unit a plurality of GNSS measurements, the plurality of GNSS measurements comprising first GNSS measurements and second GNSS measurements, wherein the first GNSS measurements are made by the signal processing unit at a first time and comprise a first pseudorange associated with a first GNSS satellite and a second pseudorange associated with a second GNSS satellite, wherein the first satellite and the second satellite are different satellites, wherein the first GNSS satellite and the second GNSS satellite are observed by the static GNSS receiver at the first time, wherein the second GNSS measurements are made by the signal processing unit at a second time and comprise a third pseudorange associated with a third GNSS satellite and a fourth pseudorange associated with a fourth GNSS satellite, wherein the third satellite and the fourth satellite are different satellites, wherein the third GNSS satellite and the fourth GNSS satellite are observed by the static GNSS receiver at the second time, wherein the second time is different from the first time;

calculate a plurality of differences comprising a first difference and a second difference, wherein the first difference is calculated between the first pseudorange and the second pseudorange, and wherein the second difference is calculated between the third pseudorange and the fourth pseudorange; and estimate a position of the static GNSS receiver based at least in part on the plurality of differences.

13. A base station for a communications network, comprising the static GNSS receiver of claim 12.

14. The base station of claim 13, wherein the base station is an indoor base station.

15. One or more tangible, non-transitory, computer-readable media storing instructions that, when executed by one or more processors, cause the one or more processors to perform operations comprising:

obtaining a plurality of GNSS measurements, the plurality of GNSS measurements comprising first GNSS measurements and second GNSS measurements, wherein the first GNSS measurements are made by a static GNSS receiver at a first time and comprise a first pseudorange associated with a first GNSS satellite and a second pseudorange associated with a second GNSS satellite, wherein the first GNSS satellite and the second GNSS satellite are different satellites, wherein the first GNSS satellite and the second GNSS satellite are observed by the static GNSS receiver at the first time, wherein the second GNSS measurements are made by the static GNSS receiver at a second time and comprise a third pseudorange associated with a third GNSS satellite and a fourth pseudorange associated with a fourth GNSS satellite, wherein the third GNSS satellite and the fourth GNSS satellite are different satellites, wherein the third GNSS satellite and the fourth GNSS satellite are observed by the static GNSS receiver at the second time, and wherein the second time is different from the first time;

calculating a plurality of differences comprising a first difference and a second difference, wherein the first difference is calculated between the first pseudorange and the second pseudorange, and wherein the second difference is calculated between the third pseudorange and the fourth pseudorange; and estimating a position of the static GNSS receiver based at least in part on the plurality of differences.

\* \* \* \* \*